United States Patent

Takahashi et al.

Patent Number: 5,177,132
Date of Patent: Jan. 5, 1993

[54] FLAME RETARDANT RESIN COMPOSITION

[75] Inventors: Hiroshi Takahashi; Seiko Nakano; Kiyoaki Okayama; Ichiro Ohkawachi, all of Yokkaichi, Japan

[73] Assignee: Mitsubishi Petrochemical Co., Ltd., Tokyo, Japan

[21] Appl. No.: 669,994

[22] Filed: Mar. 15, 1991

[30] Foreign Application Priority Data

Mar. 30, 1990 [JP] Japan .................. 2-80987

[51] Int. Cl.⁵ .................. C08J 5/10; C08K 5/15
[52] U.S. Cl. .................. 524/114; 524/409; 523/460
[58] Field of Search .................. 524/114, 409; 523/460

[56] References Cited

U.S. PATENT DOCUMENTS

| | | | |
|---|---|---|---|
| 4,338,243 | 7/1982 | Hecht et al. | 524/287 |
| 4,786,663 | 11/1988 | Miyashita et al. | 524/410 |
| 4,983,660 | 1/1991 | Yoshida et al. | 524/513 |

FOREIGN PATENT DOCUMENTS

| | | |
|---|---|---|
| 0270366 | 6/1988 | European Pat. Off. |
| 2075532 | 11/1981 | United Kingdom |
| 2186878 | 8/1987 | United Kingdom |

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

Disclosed is a polyalkylene terephthalate type flame retardant resin composition comprising:
(A) 100 parts by weight of a polyalkylene terephthalate resin,
(B) 30 to 250 parts by weight of a filler,
(C) 5 to 50 parts by weight of an organic halogen compound having a glycidyl group, and
(D) 5 to 50 parts by weight of sodium antimonate, wherein heat resistance is improved and change in molding stability is small even when it is exposed to high temperatures during molding.

14 Claims, No Drawings

FLAME RETARDANT RESIN COMPOSITION

BACKGROUND OF THE INVENTION

This invention relates to a polyalkylene terephthalate resin composition in which moldability is stabilized and also flame retardant properties are imparted.

Polyalkylene terephthalates represented by polyethylene terephthalate and polybutylene terephthalate have been widely used as electric and electronic equipments and components and automobile parts because of their excellent characteristics such as flex resistance, chemical resistance and electrical insulating property. Particularly, in the field of electric and electronic equipments and components, for the purpose of ensuring safety to fire, parts to which flame retardant properties are imparted have been employed in many cases.

For imparting flame retardant properties to a polyalkylene terephthalate type resin composition, an organic halogen compound and antimony trioxide are generally used in combination. However, this combination involves many problems that thermal stability is poor and fluidity of a resin is changed due to high temperatures during molding so that a resin may be flown out from a gap of a mold to be solidified, and a mold cannot be filled up with a resin in an injection cycle. In Japanese Unexamined Patent Publication No. 172050/1987, there has been proposed a technique in which flame retardant properties are imparted by using an organic halogen compound and sodium antimonate. However, even in this technique, fluid stability of a resin during molding cannot be maintained sufficiently.

SUMMARY OF THE INVENTION

Various investigations for solving such problems have been made as described above, but an effective means has not yet been found. An object of the present invention is to provide a flame retardant resin composition improved in fluid stability of a polyalkylene terephthalate resin during molding.

The present inventors have investigated intensively based on such a standpoint, and consequently found that by formulating an organic halogen compound having a glycidyl group and sodium antimonate into a polyalkylene terephthalate resin, fluidity of a resin during molding can be stabilized and also flame retardant properties can be imparted, to accomplish the present invention.

That is, the present invention relates to a polyalkyelene terephthalate type flame retardant resin composition comprising:

(A) 100 parts by weight of a polyalkylene terephthalate resin, (B) 30 to 250 parts by weight of a filler, (C) 5 to 50 parts by weight of an organic halogen compound having a glycidyl group, and (D) 5 to 50 parts by weight of sodium antimonate.

DESCRIPTION OF THE PREFERRED EMBODIMENTS

In the following, the present invention is described in more detail.

The polyalkylene terephthalate resin which is Component (A) of the present invention is a polyalkylene terephthalate resin obtained by polycondensation of a dicarboxylic acid component comprising at least 40 mole % of terephthalic acid, and a diol component as main components.

As a dicarboxylic acid component other than terephthalic acid described above, there may be mentioned aliphatic dicarboxylic acids having 12 to 20 carbon atoms including azelaic acid, sebacic acid, adipic acid and dodecanedicarboxylic acid; aromatic dicarboxylic acids including isophthalic acid, orthophthalic acid, naphthalenedicarboxylic acid, diphenyl-4,4'-dicarboxylic acid and diphenylethane-4,4'-dicarboxylic acid; or alicyclic dicarboxylic acids represented by cyclohexanedicarboxylic acid, or a mixture thereof.

As the above diol component, there may be mentioned aliphatic glycols having 2 to 20 carbon atoms such as ethylene glycol, propylene glycol, 1,4-butanediol, neopentyl glycol, 1,5-pentanediol, 1,6-hexanediol, decamethylene glycol and cyclohexanedimethanol, and long chain glycols having a molecular weight of 400 to 6,000 such as polyethylene glycol, poly-1,3-propylene glycol and polytetramethylene glycol or a mixture thereof.

Representative examples of the polyalkylene terephthalate resin comprising the above dicarboxylic acid component and diol component may include polyethylene terephthalate, polypropylene terephthalate, polybutylene terephthalate, polyhexamethylene terephthalate and polycyclohexanedimethylene terephthalate.

In these polyalkylene terephthalate resins, an intrinsic viscosity measured at 30° C. in a solvent mixture comprising phenol and tetrachloroethane with a weight ratio of 1:1 is preferably 0.3 to 1.5, more preferably 0.4 to 1.2. If the intrinsic viscosity is less than 0.3, physical properties expected as a resin cannot be obtained, while it exceeds 1.5, fluidity becomes extremely poor, whereby it becomes difficult to molding.

Next, the filler which is Component (B) of the present invention is a fibrous or granular organic substance or inorganic substance.

When the filler is fibrous, its diameter is preferably 50 $\mu$m or less, more preferably 40 to 0.1 $\mu$m, most preferably 20 to 0.5 $\mu$m, and its length is preferably 0.1 to 10 mm, more preferably about 0.5 to 10 mm.

When the filler is granule, its average diameter is preferably 1,000 $\mu$m or less, more preferably 1 to 900 $\mu$m, most preferably 5 to 800 $\mu$m.

As a fibrous filler, there may be mentioned glass fibers, alumina fibers, silicon carbide fibers, ceramic fibers, asbestos fibers, plaster fibers, stainless steel fibers, boron fibers, carbon fibers and Kevlar fibers.

As a granular filler, there may be mentioned wallastonite; sericite; kaolin; mica; clay; bentonite; asbestos; talc; silicates such as alumina silicate; alumina; metal oxides such as silicon oxide, magnesium oxide, zirconium oxide and titanium oxide; carbonates such as calcium carbonate, magnesium carbonate and dolomite; sulfates such as calcium sulfate and barium sulfate; and glass beads, glass flakes, boron nitride and silicon carbide.

These fillers may be used alone or in combination of two or more.

If necessary, the fillers described above may be subjected to preliminary treatment by a silane type or titanium type coupling agent.

The amount of these fillers to be formulated per 100 parts by weight of polyalkylene terephthalate is 30 to 250 parts by weight, preferably 35 to 200 parts by weight. If the amount is less than 30 parts by weight, the effect as a filler cannot be exhibited, while it exceeds 250 parts by weight, fluidity during molding is poor, whereby it cannot be used practically.

As the organic halogen compound having a glycidyl group which is Component (C), there may be used a glycidyl compound substituted with a halogen such as chlorine and bromine, generally a compound in which a group having a glycidyl group is bonded to an aromatic ring substituted with a halogen.

The amount of the halogen to be contained is preferably 40% by weight or more, particularly preferably 45% by weight or more.

The epoxy equivalent is preferably 3,000 or more, more preferably 3,500 or more, particularly preferably 4,000 or more. If the epoxy equivalent is less than 3,000, good molding stability cannot be obtained.

Particularly, polyvalent epoxides are preferred.

In the following, examples of these epoxides are shown.

1) Halogenated bisphenol type epoxide

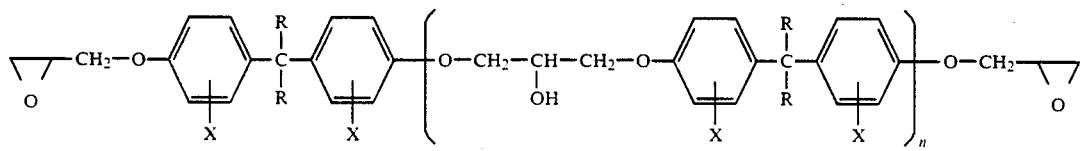

wherein R represents H or $CH_3$; X represents 1 to 4 Br's or Cl's; and n represents a real number of 0 to 100, preferably 0.1 to 20.

As a kind of the halogen, bromine and chlorine are particularly preferred.

The amount of these organic halogen compounds having a glycidyl group to be formulated is 5 to 50 parts by weight, preferably 7 to 40 parts by weight, more preferably 7 to 35 parts by weight based on 100 parts by weight of polyethylene terephthalate. If the amount is less than 5 parts by weight, flame retardant properties are not sufficient in some cases, while it exceeds 50 parts by weight, a practical level of mechanical strength cannot be maintained in some cases.

The amount of sodium antimonate which is Component (D) to be formulated is 5 to 50 parts by weight, preferably 7 to 40 parts by weight based on 100 parts by weight of polyethylene terephthalate. If the amount is less than 5 parts by weight, flame retardant properties are not sufficient in some cases, while it exceeds 50 parts by weight, a practical level of mechanical strength cannot be maintained in some cases.

2) Halogenated novolak type epoxide

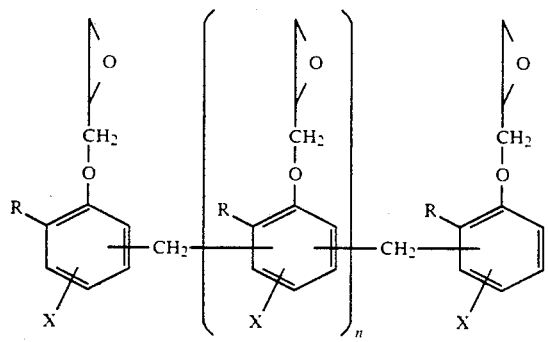

3) Halogenated glycidylamine type epoxide

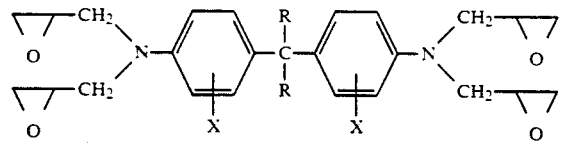

4) Other epoxide having a halogenated aromatic ring

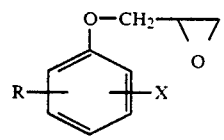

In addition to the components of the present invention, an antioxidant, a thermal stabilizer, a UV absorber, a plasticizer, a crystal nucleating agent, a crystallization accelerator, a pigment, a colorant and an antistatic agent can be formulated within the range which does not impair the object of the present invention.

The flame retardant resin composition of the present invention can be prepared easily by a conventional melting and kneading method.

EXAMPLES

The present invention is described below by referring to Examples.

Polyalkylene terephthalate, a filler, an organic halogen compound having a glycidyl group and sodium antimonate were formulated at a rate shown in the following table, and the mixture was melted and kneaded by a single axis extruder of 40 mm$\phi$ and then pelletized. After the pellets obtained were dried at 130° C. for 5 hours, a test strip was molded by using a 5-ounce injection molding machine at a mold temperature of 80° C.

Molding stability was evaluated according to the JIS 7210 method, and measurement was conducted at a temperature of 300° C. Molding stabilities at a starting point and at residence times of 10 minutes and 20 minutes were compared, and judgement was made based on a change relative to the value at the starting point.

Flame retardant properties were examined according to the UL-94 test method and by employing a test trip with a thickness of 1/32 inch.

TABLE

| | Comparative example | | | Example | | | | | | |
|---|---|---|---|---|---|---|---|---|---|---|
| | 1 | 2 | 3 | 1 | 2 | 3 | 4 | 5 | 6 | 7 |
| Composition (parts by weight) (A) | | | | | | | | | | |
| PET-A (Note 1) | 100 | 100 | 100 | 100 | 50 | | 75 | 100 | 100 | 100 |

TABLE-continued

|  | Comparative example | | | Example | | | | | | |
| --- | --- | --- | --- | --- | --- | --- | --- | --- | --- | --- |
|  | 1 | 2 | 3 | 1 | 2 | 3 | 4 | 5 | 6 | 7 |
| PET-B (Note 2) |  |  |  |  | 50 |  |  |  |  |  |
| PBT (Note 3) |  |  |  |  |  | 100 | 25 |  |  |  |
| (B) |  |  |  |  |  |  |  |  |  |  |
| G/F (Note 4) | 50 | 50 | 60 | 60 | 60 | 60 | 60 | 40 | 100 | 60 |
| Talc |  |  |  |  |  |  |  | 20 |  |  |
| (C) |  |  |  |  |  |  |  |  |  |  |
| Brominated epoxy A (Note 5) | 20 |  |  | 20 | 20 | 20 | 20 | 20 |  | 30 |
| Brominated epoxy B (Note 6) |  |  |  |  |  |  |  |  | 20 |  |
| Brominated polystyrene (Note 7) |  | 20 |  |  |  |  |  |  |  |  |
| (D) |  |  |  |  |  |  |  |  |  |  |
| Sodium antimonate |  | 20 | 20 | 20 | 20 | 20 | 20 | 20 | 20 | 10 |
| Molding stability |  |  |  |  |  |  |  |  |  |  |
| (MFR) g/10 min |  |  |  |  |  |  |  |  |  |  |
| Starting point | 17 | 120 | 78 | 63 | 26 | 150 | 94 | 45 | 19 | 37 |
| 10 minutes | not flown | 430 | 260 | 72 | 33 | 170 | 110 | 56 | 22 | 28 |
| 20 minutes | not flown | unmeasurable | 480 | 79 | 38 | 180 | 130 | 69 | 31 | 43 |
| Flame retardant properties UL-94 | V-2 | HB | V-0 | V-0 | V-0 | V-0 | V-0 | V-0 | V-0 | V-0 |

(Note 1): PET (polyethylene terephthalate)-A, manufactured by Kurarey K.K. Intrinsic viscosity: 0.68
(Note 2): PET (polyethylene terephthalate)-B, manufactured by Kanobo K.K. Intrinsic viscosity: 0.75
(Note 3): PBT (polybutylene terephthalate), 5010 (trade name), manufactured by Mitsubishi Kasei Corporation
(Note 4): G/F (glass fiber), CS03JA416 (trade name), manufactured by Asahi Fiber Glass K.K.
(Note 5): Brominated epoxy A, EBR101 (trade name), manufactured by Manak K.K. Adduct of tetrabromobisphenol A diglycidyl ether and brominated bisphenol A Epoxy equivalent: 20,000
(Note 6): Brominated epoxy B, EBR107 (trade name), manufactured by Manak K.K. Adduct of tetrabromobisphenol A diglycidyl ether and brominated bisphenol A Epoxy equivalent: 5,000
(Note 7): Brominated polystyrene, Pyrocheck 68PB (trade name), manufactured by Nissan Ferro Yuki Kagaku K.K.

As clearly seen from the above test results, it can be understood that the compositions comprising components and formulating amounts of the present invention can exhibit excellent molding stability and flame retardant properties when compared with the compositions for comparison.

We claim:

1. A polyalkylene terephthalate type flame retardant resin composition comprising:
   (A) 100 parts by weight of a polyalkylene terephthalate resin,
   (B) 30 to 250 parts by weight of a filler,
   (C) 5 to 50 parts by weight of an organic halogen compound having a glycidyl group, and
   (D) 5 to 50 parts by weight of sodium antimonate.

2. The composition according to claim 1, which comprises
   (A) 100 parts by weight of a polyalkylene terephthalate resin,
   (B) 35 to 200 parts by weight of a filler,
   (C) 7 to 40 parts by weight of an organic halogen compound having a glycidyl group, and
   (D) 7 to 40 parts by weight of sodium antimonate.

3. The composition according to claim 1, which comprises
   (A) 100 parts by weight of a polyalkylene terephthalate resin,
   (B) 35 to 200 parts by weight of a filler,
   (C) 7 to 35 parts by weight of an organic halogen compound having a glycidyl group, and
   (D) 7 to 40 parts by weight of sodium antimonate.

4. The composition according to claim 1, wherein the polyalkylene terephthalate resin is polyethylene terephthalate, polypropylene terephthalate or polybutylene terephthalate.

5. The composition according to claim 1, wherein the filler is a fibrous material.

6. The composition according to claim 1, wherein the filler is a granular material.

7. The composition according to claim 1, wherein the filler comprises a fibrous material and a granular material.

8. The composition according to claim 1, wherein the organic halogen compound is a compound in which a group having a glycidyl group is bonded to an aromatic ring substituted with a halogen.

9. The composition according to claim 8, wherein the organic halogen compound is a polyvalent epoxide.

10. The composition according to claim 1, wherein the organic halogen compound is a halogenated bisphenol type epoxide represented by the following formula:

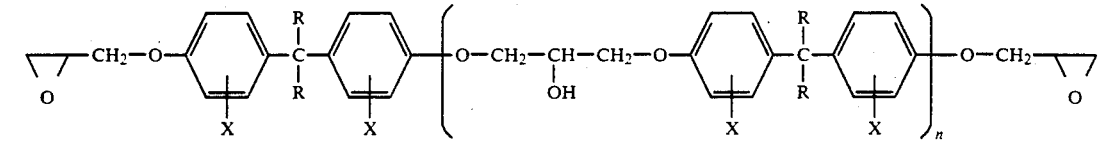

wherein R represents hydrogen or methyl group; X represents 1 to 4 bromine or chlorine atom(s); and n represents a real number of 0 to 100.

11. The composition according to claim 1, wherein the organic halogen compound is a halogenated novolak type epoxide represented by the following formula:

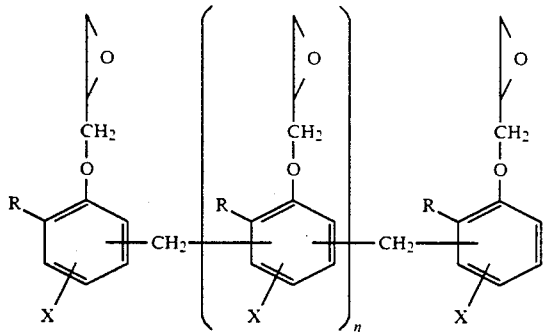

wherein R represents hydrogen or methyl group; X represents 1 to 4 bromine or chlorine atom(s); and n represents a real number of 0 to 100.

12. The composition according to claim 1, wherein the organic halogen compound having a glycidyl group is a halogenated novolak type epoxide represented by the following formula:

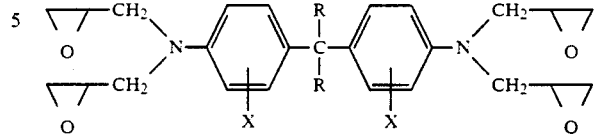

wherein R represents hydrogen or methyl group; X represents 1 to 4 bromine or chlorine atom(s); and n represents a real number of 0 to 100, preferably 0.1 to 20.

13. The composition according to claim 1, wherein the epoxy equivalent of the organic halogen compound having a glycidyl group is 3,000 or higher.

14. The composition according to claim 1, wherein the halogen content of the organic halogen compound having a glycidyl group is 40% by weight or more.

* * * * *